United States Patent

Werner et al.

[11] Patent Number: 5,479,903
[45] Date of Patent: Jan. 2, 1996

[54] V-SHAPED INTERNAL COMBUSTION ENGINE

[75] Inventors: Johannes Werner, Waiblingen; Klaus-Jürgen Thiele, Nürtingen; Emil Bäuerle, Esslingen; Walter Kerschbaum, Fellbach; Peter Bauknecht, Steinheim, all of Germany

[73] Assignee: Mercedes-Benz AG, Stuttgart, Germany

[21] Appl. No.: 285,046

[22] Filed: Aug. 3, 1994

[30] Foreign Application Priority Data

Aug. 4, 1993 [DE] Germany .......................... 43 26 159.0

[51] Int. Cl.$^6$ ............................. F02B 75/22; F01L 1/04; F02M 39/02
[52] U.S. Cl. ............................ 123/509; 123/54.4
[58] Field of Search ................... 123/54.4, 54.6, 123/54.7, 90.1, 90.25, 507, 508, 509, 41.31

[56] References Cited

U.S. PATENT DOCUMENTS

| | | | |
|---|---|---|---|
| 1,949,470 | 3/1934 | Hesselman | 123/508 |
| 2,746,435 | 5/1956 | Kremser | 123/54.4 |
| 2,921,567 | 1/1960 | Medenus | 123/54.4 |
| 2,927,565 | 3/1960 | Turner | 123/54.4 |
| 2,990,819 | 7/1961 | Bouvy | 123/54.4 |
| 3,884,201 | 5/1975 | Cregan | 123/54.7 |
| 3,908,613 | 9/1975 | Loby | 123/508 |
| 4,058,092 | 11/1977 | Hikosaka et al. | 123/54.4 |
| 4,080,945 | 3/1978 | Hikosaka et al. | 123/54.6 |
| 4,412,513 | 11/1983 | Obermayer et al. | 123/509 |
| 5,083,544 | 1/1992 | Brighigna | 123/508 |

FOREIGN PATENT DOCUMENTS

| | | |
|---|---|---|
| 0543301 | 5/1993 | European Pat. Off. . |
| 2007102 | 1/1970 | France . |
| 2475626 | 8/1981 | France . |
| 0966708 | 9/1957 | Germany . |
| 1079888 | 4/1960 | Germany . |
| 1185013 | 1/1965 | Germany . |
| 2823357 | 12/1978 | Germany . |
| 3910794 | 10/1990 | Germany . |
| 3935883 | 5/1991 | Germany . |
| 4030947 | 10/1991 | Germany . |
| 2070685 | 9/1981 | United Kingdom . |

Primary Examiner—Marguerite Macy
Attorney, Agent, or Firm—Klaus J. Bach

[57] ABSTRACT

In a multicylinder internal combustion engine with cylinder banks arranged in the shape of a V wherein a single cam shaft is supported centrally within the V space between the cylinder banks and push rods are disposed in push rod guides formed alongside the two cylinder banks so as to be operable by the cam shaft for actuating inlet and outlet valves of associated cylinders via rocker arms, fuel injection pumps are supported in mounting openings formed into the cylinder banks along the sides thereof so as to be also operable by the cam shaft for the injection of fuel into the cylinders via injectors mounted to the cylinders, the push rods and the fuel pumps are also arranged in V-shaped rows along the cylinder banks and coolant channels extend along each cylinder bank between the cylinders and the fuel pumps wherein, a cross-sectional plane extending through a particular cylinder, the pump mounting openings, the coolant channels, the push rod guides and the associated cylinder are disposed in a fan-like arrangement.

7 Claims, 2 Drawing Sheets

V-SHAPED INTERNAL COMBUSTION ENGINE

BACKGROUND OF THE INVENTION

The invention relates to a multicylinder internal combustion engine with cylinder banks arranged in the shape of a V, and having a cylinder heads with inlet and outlet valves operated by means of a cam shaft via push rods and rocker arms and with a fuel injection arrangement including cam operated fuel pumps and fuel injectors mounted on the cylinder head for the injection of fuel supplied by the pumps.

DE 28 23 357 A1 discloses an internal combustion engine of this type which includes cylinder banks arranged in the shape of a V wherein each cylinder bank includes a cam shaft for the operation of the inlet and outlet valves via push rods and rocker arms. There is for each cylinder a fuel injection arrangement which consists of a pump with integral injector (pump injector) and which is received in a cavity formed in the cylinder head. The pump injectors of one of the cylinder banks and the pump injectors of the other cylinder bank are operated by respective cam shafts.

There is further provided a longitudinal cooling water channel which, at the level of the cylinder head covers, extends on the outside over all the cylinders of a cylinder bank.

DE 26 15 742 C2 discloses an internal combustion engine with a cam shaft arranged in the crankcase and adapted to operate the inlet and outlet valves and also the fuel pumps but which includes between the cylinder banks a mounting platform for supporting double pump units arranged in a row and combined so as to form units.

It is the principal object of the present invention to provide a V-shaped internal combustion engine in such a manner that manufacturing costs are relatively low and which, furthermore, provides for a highly compact engine design.

SUMMARY OF THE INVENTION

In a multicylinder internal combustion engine with cylinder banks arranged in the shape of a V wherein a single cam shaft is supported centrally within the V space between the cylinder banks and push rods are disposed in push rod guides formed alongside the two cylinder banks so as to be operable by the cam shaft for actuating inlet and outlet valves of associated cylinders via rocker arms, fuel injection pumps are supported in mounting openings formed into the cylinder banks along the sides thereof so as to be also operable by the cam shaft for the injection of fuel into the cylinders via injectors mounted to the cylinders, the push rods and the fuel pumps are also arranged in V-shaped rows along the cylinder banks and coolant channels extend along the cylinder banks between the cylinders and the fuel pumps wherein, in a cross-sectional plane extending through a particular cylinder, the pump mounting openings, the coolant channels, the push rod guides and the associated cylinder are disposed in a fan-like arrangement.

The particular arrangement of the cavities for the reception of the pumps in both cylinder banks and the particular location and arrangement of the single cam shaft for the operation of all the inlet and outlet valves and the pumps provides for a highly compact and lightweight engine design. Furthermore mechanical friction is relatively low because there are relatively few cam shaft bearings which results in reduced fuel consumption and reduced amounts of harmful emissions. Also, in case of operational problems or malfunctions of the pump system, the pumps are easily accessible and rapidly replaceable. With the pump cavities for the two cylinder banks being arranged at an angle which is smaller than that between the opposite push rod guide passages, the pumps are arranged in the V-shaped space between the cylinder banks outside the cooling water jacket and are therefore subjected to only relatively low temperatures which increases the operational reliability of the pumps.

The fan-like even distribution of the components in the order according to the invention as shown in FIG. 3 results in a wide spreading of the load area under the cam shaft.

The openings for receiving the pumps are so arranged along the sides of the cylinder banks that the pump support is provided on flat surfaces without niches so that the pump support surfaces can be machined easily and, since the pump reception openings are arranged in a line, in a continuous machining process moving longitudinally along the cylinder banks (see FIG. 5).

The particular arrangement of the cams for the pumps and the inlet and outlet valves of both cylinder banks requires only short injection pipes and, if the pump mounting openings are arranged in spaced relationship adjacent the cam shaft bearings with valve push rod passages disposed in the space therebetween the cam shaft bending moments are relatively small since the load on the intermediate cams, which serve to operate the valves, is smaller than that on the pump cams.

The invention will become more readily apparent from the following description of particular embodiments thereof.

DESCRIPTION OF PREFERRED EMBODIMENTS

Figure 1:
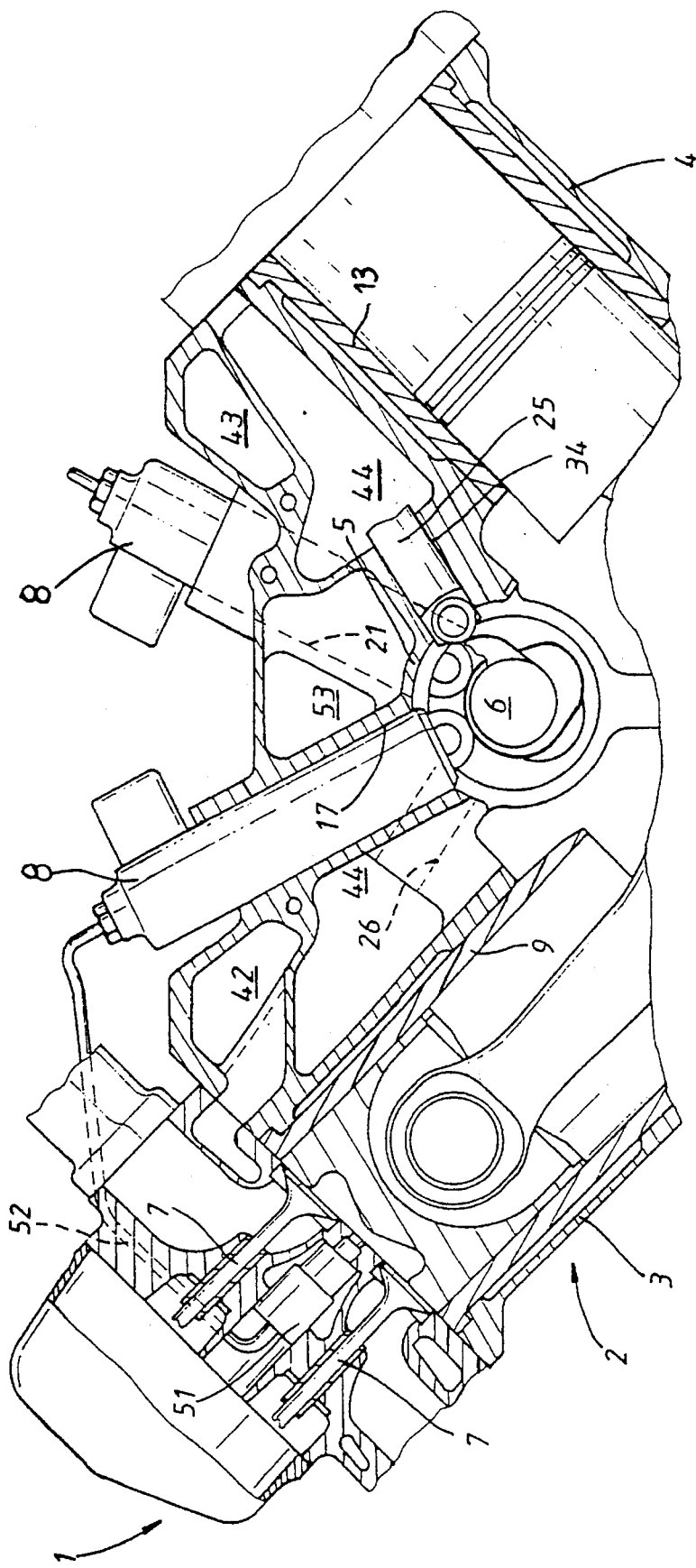
FIG. 1 is a cross-sectional view of an internal combustion engine according to the invention.

A multicylinder internal combustion engine 1 having a cylinder housing 2 with cylinder banks 3, 4 arranged in the shape of a V includes deep in the V space a cam shaft passage 5 for supporting a cam shaft 6 which is adapted to serve as a drive shaft for operating all the inlet and outlet valves 7 and the fuel injection pumps 8 of both cylinder banks 3, 4.

Along the inner longitudinal sides of both cylinder banks 3, 4 with the cylinders 9, 10, 11, 12 and the cylinders 13, 14, 15, 16 the housing has openings 17, 18, 19, 20 and 21, 22, 23, 24 for the reception and mounting of the pumps 8 and with axes arranged at angles forming V-shaped rows corresponding to the V shape of the cylinder banks. The angle between corresponding opposite pump mounting openings 17 to 24 which are open toward the cam shaft passage 5 is about 55°.

Between the cylinders and the pump mounting openings there are arranged push rods 25 disposed in push rod guides which, for one cylinder bank, are designated by numerals 26 to 33 and, for the other cylinder bank are designated by numerals 34 to 41. The angle between corresponding opposite push rod guides is larger than the angle formed between corresponding pump mounting openings and larger than the angle formed between the two cylinder banks, the angle formed between the cylinders being larger than that formed between the axes of corresponding opposite pump mounting openings. The angle formed between corresponding opposite push rod guides is about 110° whereas the angle between the cylinder banks is about 90°.

Each of the cylinder banks 3, 4 is provided with coolant channels 42, 43 extending each between the respective push rod guides and pump mounting openings. The channel structures are water return channels arranged at the level of the pump support surfaces 17a to 24a of the pump mounting openings 17 to 24. Accordingly, in a cross-sectional plane extending through the cylinder housing 2 for each cylinder the following areas are arranged in a fan-like fashion starting from the V space between the cylinder banks 3, 4: the pump mounting openings, the longitudinal cooling channel the push rod guides and the cylinder.

Under the coolant channels 42, 43 between the cylinders and the pump mounting openings there is a push rod space 44 and between the two pump mounting openings 17, 21 there is a further coolant channel which is a coolant supply channel 53 for supplying coolant channel which is a coolant supply channel 53 for supplying coolant to the respective cylinders (see FIG. 1). As shown in FIG. 1 the coolant supply channel 53 extends centrally between the housing structures defining the pump mounting openings such that the coolant partially surrounds the pump mounting opening walls. The pump mounting openings 17 to 24 are provided with pump mounting surfaces 17a to 24a which are free of any niches, that is, at the longitudinal sides of the cylinder banks there are neither projections nor recesses which would inhibit machining of the pump mounting surfaces. Consequently the pump mounting surfaces which are arranged in a line can be machined with a single passage of the milling cutter along a cylinder bank.

Figure 3:
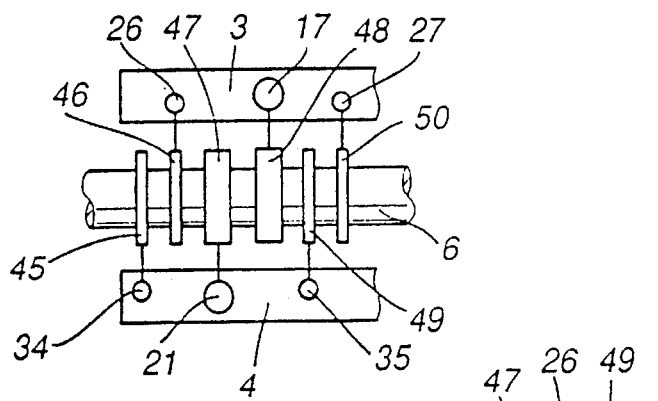
FIG. 3 illustrates schematically the arrangement of the cams of the common cam shaft.

FIG. 3 shows the cooperative arrangement of the cams 45 to 50 disposed on the common cam shaft 6 with the inlet and outlet valves 7 and the fuel injection pumps 8 of two opposite cylinders 9, 13 of the two cylinder banks 3, 4. Specifically, the outer cam 45 is associated with the push rod guide 34 of the cylinder bank 4, the cam 46 with the push rod guide 26 of the cylinder bank 3, the wider cam 47 with the mounting opening 21 of the injection pump 8 in the cylinder bank 4 and the cam 48 of the same width with the injection pump mounting opening 17 of the cylinder bank 3; further the cam 49 is associated with the push rod guide 35 of the cylinder bank 4 and the cam 50 with the push rod guide 27 of the cylinder bank 3. This arrangement provides for the shortest pipe lengths between the injection pumps 8 and the respective fuel injectors 51 of the fuel injection lines 52.

Figure 4:
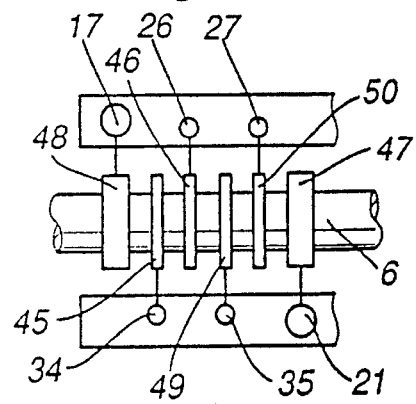
FIGS. 4 and 5 show other cam arrangements.

Another embodiment is shown in FIG. 4. Here the wide cams 48, 47 associated with the mounting openings 17, 21 of the pumps 8 are disposed on the outside. Of the cam 45, 46 and 49, 50 for the operation of the inlet and outlet valves 7, the cam 45 is associated with the push rod guide 34 of the cylinder bank 4, the cam 46 with the push rod guide 26 of the cylinder bank 3 and the cam 49 with the push rod guide 35 of the cylinder bank 4 and further the cam 50 with the push rod guide 27 of the cylinder bank 3. The injection lines require somewhat greater pipe lengths in this arrangement but it is an advantage that the pump cams are disposed on the outside of the arrangement adjacent the cam shaft bearings (which are not shown) and consequently generate smaller bending moments which results in a reduced cam shaft load.

Figure 5:
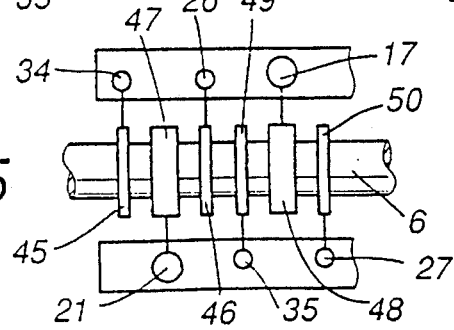

In the embodiment according to FIG. 5 the cams 47, 48 associated with the mounting openings 21, 17 for the pumps 8 of the opposite cylinder banks 4, 3 are disposed between the cams 45, 46 and 49, 50 which operate the inlet and outlet valves 7. In this case the cams 45, 46 are associated with the valve guides 34, 26 of the cylinder banks 3, 4 and the cams 49, 50 are associated with the valve guides 35, 27 of the cylinder banks 4, 3.

Figure 2:
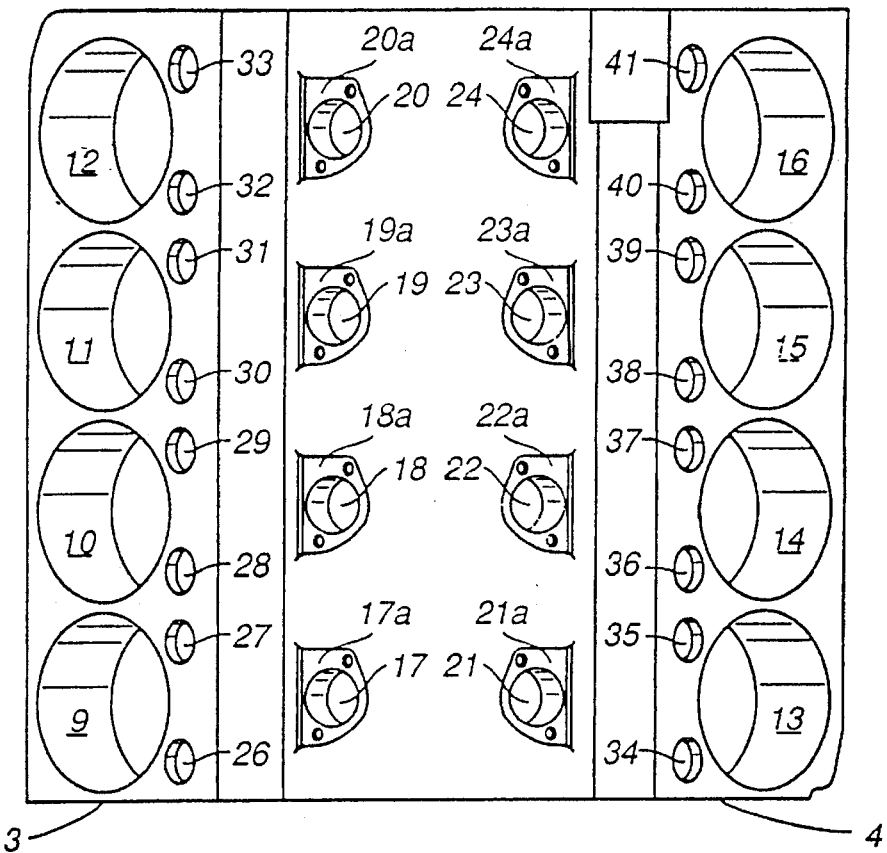
FIG. 2 is a top view of the housing of the internal combustion engine of FIG. 1.

It is finally noted that, if all the pump mounting openings are arranged in the same spacial relationship with the respective cylinders or the injection pumps of the respective cylinders, the injection lines are all of the same shape so that only one type of injection line is required. Preferably the axes of associated cylinders and pump mounting openings are disposed in the same plane normal to the cam shaft as shown in FIG. 2.

What is claimed is:

1. A multicylinder internal combustion engine comprising cylinder banks arranged in the shape of a V to define a V space between the cylinder banks and having a cam shaft supported centrally within the V space between the cylinder banks and with push rods disposed in push rod guides alongside said cylinder banks so as to be operable by said cam shaft and inlet and outlet valves operable by said push rods via rocker arms disposed on said cylinder banks and a fuel injection system including fuel pumps supported in a pump housing structure having mounting openings arranged alongside said cylinder banks so as to be operable by said cam shaft and fuel injectors for injecting fuel into said cylinders, said push rods and said fuel pumps also being arranged in V-shaped rows along said cylinder banks, each of said cylinder banks having a coolant return channel extending alongside thereof between said cylinders and said fuel pumps, said coolant return channel projecting from said cylinder banks and having said pump housing structure connected thereto, and a coolant supply channel extending centrally between said pump housing structures such that said coolant partially surrounds the walls defining said pump mounting openings, said fuel pump mounting opening, said coolant, channels, said push rod guides and associated cylinders, being disposed in a fan-like arrangement in a cross-sectional plane extending through a particular cylinder.

2. An internal combustion engine according to claim 1, wherein the angle defined between the axes of the opposite pump mounting passages of the two cylinder banks is smaller than the angle defined between the axes of the respective opposite push rod guides.

3. An internal combustion engine according to claim 2, wherein the angle defined between the axes of said opposite pump mounting passages is at most 70°.

4. An internal combustion engine according to claim 1, wherein each of said pump mounting openings is provided with a pump support surface which is free of niches so as to facilitate machining of said pump support surfaces.

5. An internal combustion engine according to claim 1, wherein said cam shaft includes a cam for each of said pumps and each of said valves, and wherein the cams for the pumps associated with opposite cylinders of the two cylinder banks are disposed between the cams for the valves of the associated opposite cylinders and the cams for the valves—starting with an outer cam—are associated alternately with the one and the other of the opposite cylinders.

6. An internal combustion engine according to claim 1, wherein said cam shaft includes a cam for each of said pumps and each of said valves and the cams for said valves of two opposite cylinders of the two cylinder banks are disposed between the cams for the associated fuel pumps and the cams for the valves are associated alternately with the one and the other of the opposite cylinders.

7. An internal combustion engine according to claim 1, wherein said cam shaft includes a cam for each of said pumps and each of said valves and two of said valve cams of two opposite cylinders are disposed between the two fuel pump cams of said opposite cylinders and the two remaining fuel pumps cams are disposed on opposite sides of said fuel pump cams, said cams being associated alternately with the one and the other of the opposite cylinders.

* * * * *